United States Patent [19]

Appel

[11] Patent Number: 4,667,769
[45] Date of Patent: May 26, 1987

[54] SUPERCHARGER INTAKE AIR MUFFLER OR SOUND ABSORBER, AND METHOD OF MUFFLING INRUSH AIR

[75] Inventor: Manfred Appel, Neusäss-Steppach, Fed. Rep. of Germany

[73] Assignee: Man-B&W Diesel GmbH, Augsburg, Fed. Rep. of Germany

[21] Appl. No.: 821,687

[22] Filed: Jan. 23, 1986

[30] Foreign Application Priority Data

Feb. 23, 1985 [DE] Fed. Rep. of Germany ....... 3506452

[51] Int. Cl.$^4$ ............................................. F02M 35/00
[52] U.S. Cl. .................................... 181/229; 181/268; 181/269; 181/280
[58] Field of Search ............... 181/229, 256, 274, 279, 181/280, 268, 269; 415/119

[56] References Cited

U.S. PATENT DOCUMENTS

| 1,015,698 | 1/1912 | Maxim | 181/279 |
|---|---|---|---|
| 2,057,304 | 10/1936 | Saint-Jacques | 181/274 |
| 2,438,426 | 3/1948 | Whittle | 415/98 |
| 4,204,586 | 5/1980 | Hani et al. | 181/229 |

FOREIGN PATENT DOCUMENTS 503289 2/1928 Fed. Rep. of Germany ...... 181/279
2600860 12/1975 Fed. Rep. of Germany .

OTHER PUBLICATIONS

Textbook–Axial–and Radial–Compressors.

Primary Examiner—Benjamin R. Fuller
Attorney, Agent, or Firm—Frishauf, Holtz, Goodman & Woodward

[57] ABSTRACT

To reduce the speed of air being sucked towards a compressor turbine wheel, typically an exhaust gas supercharger turbine for an internal combustion engine, guide vanes (18) are located in the path of air being supplied to an inlet (3) of the compressor (1) which are positioned to impart a rotating component of motion to the air stream of air column being supplied to the compressor, the guide vanes extending essentially perpendicularly to the plane of radially positioned damping elements (14), while being inclined with respect to a radial line (19) passing through the axis of rotation of the compressor and, typically, of the housing (8) which has an air-pervious circumferential wall (8). The speed of air being supplied to the turbine thus can be reduced below Mach 1, thereby increasing the efficiency of operation of the turbine while substantially reducing its noise level.

14 Claims, 9 Drawing Figures

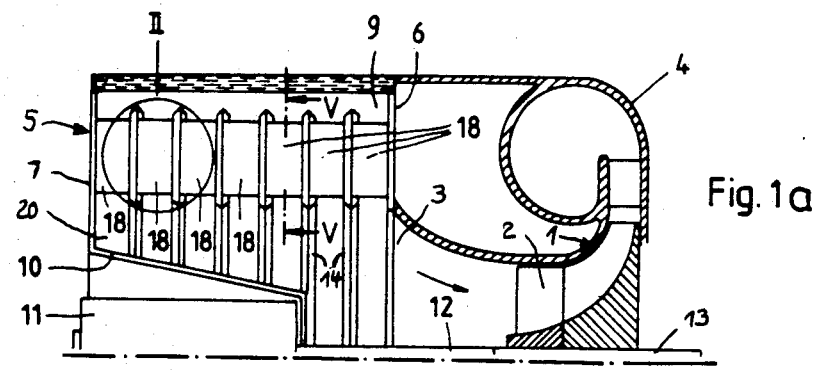
Fig. 1a
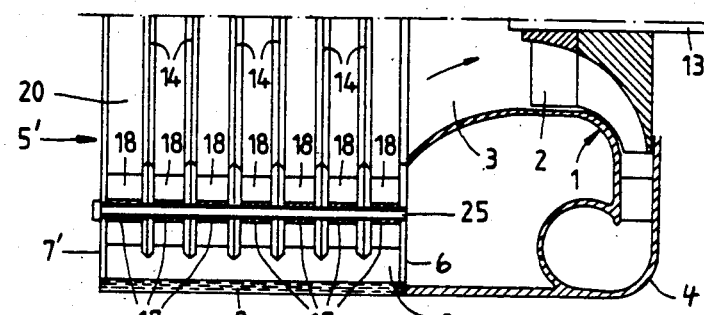
Fig. 1b
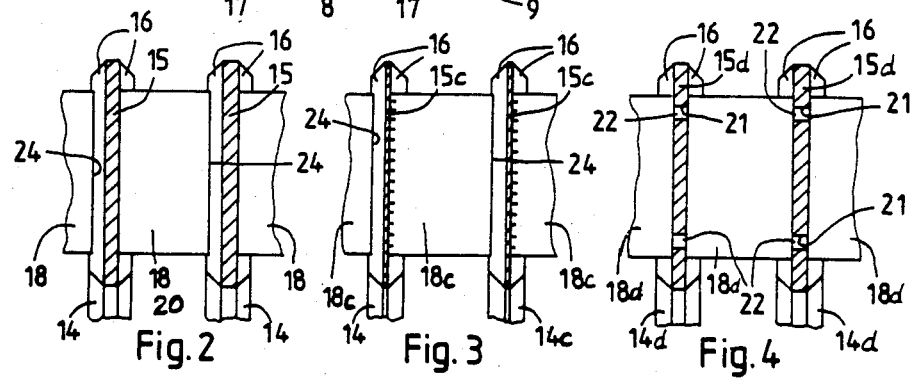
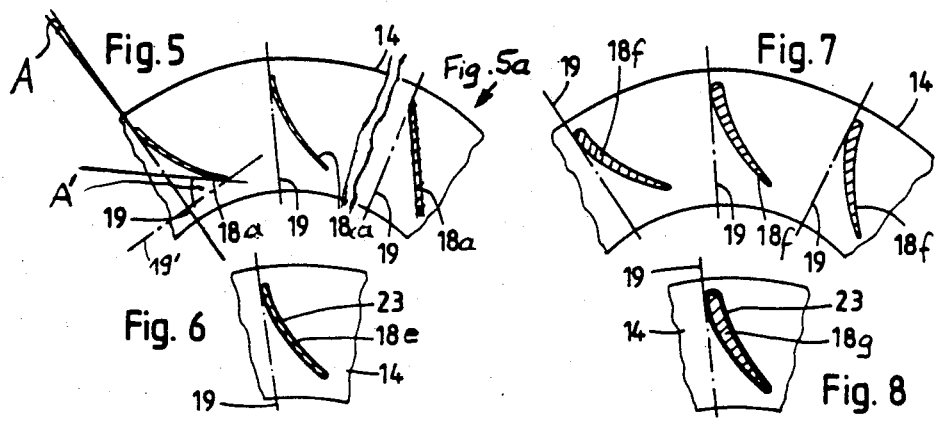

SUPERCHARGER INTAKE AIR MUFFLER OR SOUND ABSORBER, AND METHOD OF MUFFLING INRUSH AIR

Reference to related application, assigned to the assignee of the present application: U.S. Ser. No. 826,560, filed Feb. 6, 1986, SCHRODER et al German Patent Disclosure Document DE-OS 26 00 860.

The present invention relates to a muffler or sound absorber to muffle or absorb the noise of inrush air being supplied to a turbo supercharger, and especially to an exhaust gas turbo supercharger adapted to receive the exhaust gases from an internal combustion engine (ICE), and to a method of muffling the inrush air.

BACKGROUND

Various types of internal combustion engines (ICEs) utilize exhaust gas turbo superchargers to introduce additional charging air into the inlet manifold of the ICE. The turbo supercharger may operate continuously, or intermittently. Since the air being sucked in by the turbo supercharger may flow at high speed, undesirable inrush air noises result.

The air mass required by turbo superchargers, and particularly exhaust gas turbo superchargers, is considerable, and the compression effected by the turbo supercharger also is high. Consequently, high air flow rates occur at the inlet to the turbo supercharger compressor wheel. The speed of the inlet air may be in excess of Mach 1. Air flow speeds which pass, and exceed Mach 1, decrease the efficiency of the compressor, decrease the range of variation of throughput with respect to speed, and result in undesirable noise levels of operation.

It has previously been proposed to muffle the inrush air noises by providing a muffler or sound absorber coupled to the compressor air inlet. A muffler for use with turbo superchargers is described in the referenced German Patent Disclosure Document DE-OS 26 00 860 and in U.S. Pat. No. 4,204,586, HANI. The known muffler has an essentially tubular, circular housing of air-pervious material, through which air can rush into the hollow space formed by the muffler. The air is subdivided into various portions by ring-shaped disks which form damping elements, which, at their inner ends, are bent in the direction of the inlet funnel of the turbo supercharger. The air which is sucked in radially from ambient space thus receives a directional component towards the compressor wheel. Arrangements of this type do not, however, change the inrush air speed at the inlet to the compressor wheel, and, consequently, do not provide air to the compressor wheel at substantially reduced speeds.

THE INVENTION

It is an object to provide a noise suppressor or muffler, particularly for use with an exhaust gas turbo supercharger in which the inrush air is supplied at a speed below that of prior art mufflers, and, specifically, with inrush air speeds below Mach 1, so that the decrease in efficiency and the range of operating characteristics of the turbo supercharger are avoided.

Briefly, the inrush air to the turbo supercharger has a rotary component imparted thereto, so that any discrete volume of air will be supplied to the turbo supercharger in a spiral path. In accordance with a feature of the invention, guide vanes are positioned in the stream of air flow from ambient space and between directing disks, which guide vanes are circumferentially distributed within the housing and extend essentially perpendicularly to the plane of disk-like damping elements extending transversely across the tubular housing, while being inclined with respect to a radial line passing through the axis of the housing, so that air being sucked through the pervious periphery of the housing towards the interior thereof by the turbine compressor wheel of the supercharger will receive a rotary direction about the axis of the housing, so that the air being supplied to the compressor wheel will form a rotating air column or a rotating air stream.

The apparatus, and the method carried out by the apparatus, has the advantage that the air which is sucked in by the turbo supercharger is so directed by the guide vanes within the muffler itself that the resulting air flow will be rotating, that is, any discrete air volume will progress towards the turbo supercharger in a spiral path. This substantially reduces the inrush air speed, and specifically reduces the speed of the air rushing in through the muffler by the desired amount. The degree of rotation, that is, the spiral path of any discrete volume, can be controlled by suitable adjustment of the angle of the guide vanes with respect to a radial line from the axis of the muffler housing. The vanes form, in effect, a radial grid which, besides the function of causing rotary movement of the air mass or air column, has an additional sound damping effect; by coating the elements about which the air passes or rushes with a sound damping material, the overall sound damping effect can be additionally enhanced.

DRAWINGS

FIG. 1a illustrates, in part-sectional, part side view, a turbo supercharger compressor inlet and an embodiment of the muffler coupled thereto;

FIG. 1b is a view similar to FIG. 1a, and illustrating another embodiment;

FIG. 2 is an enlarged, fragmentary sectional view of the portion within the circle II of FIG. 1a;

FIG. 3 is another embodiment of the structure within the circle II;

FIG. 4 illustrates another embodiment of the structure within the circle II;

FIG. 5 is a detail sectional view along line V—V of FIG. 1a; and

FIGS. 6, 7 and 8 are alternative embodiments of structures, seen in the direction of the section line V—V of FIG. 1a.

FIG. 5a is a detail sectional view along V—V of FIG. 1a with flat guide vanes.

In the various views, similar elements have been given the same reference numerals and in different embodiments prime or subscript notations have been used.

DETAILED DESCRIPTION

A turbo supercharger compressor 1, not further shown, and which may, for example, have the structure of the referenced application assigned to the assignee of the present application Ser. No. 826,560, filed Feb. 6, 1986, SCHRODER et al includes a compressor wheel 2, receiving air through an inlet funnel 3. A spiral housing 4 receives compressed air.

A sound absorber or muffler, generally shown at 5, is coupled to the inlet of the air funnel 3 of the turbo supercharger. The muffler 5 has a back wall 6 which is attached to the inlet portion of the supercharger in any suitable manner, for example by flanges and the like, not shown.

The turbo supercharger has a front wall 7 and a tubular housing wall 8 which extends between the back wall 6 and the front wall 7 and is formed, for example, by an air-pervious air filter structure. In the embodiment of FIG. 1a, the front wall 7 is formed by a flat ring-shaped element which merges with a cup-shaped portion 10, extending funnel-like towards the air inlet 3 of the turbo supercharger. An electric motor 11 can be located within the inwardly flared portion of the muffler 5, defined by the wall 10. The shaft 12 of the motor can be coupled to a shaft 13 of the turbo supercharger wheel 2 which, in turn, can be coupled to an exhaust gas turbine coupled to the ICE. If the exhaust gases should be insufficient to drive the turbine, the electric motor 11 is then energized.

The embodiment of FIG. 1b is identical to the embodiment of FIG. 1a, except that the front wall 7′ extends flat to the center or axis of the muffler 5′, and the electric motor 11 is omitted. The turbine wheel 2, thus, is then driven entirely by exhaust gases from the ICE and/or additional compressed air, for example as explained in the referenced application Ser. No. 826,560, filed Feb. 6, 1986, SCHRODER et al.

Damping elements 14 are located within the interior space 9 of the muffler 5, 5′, staggered axially from each other and spaced from each other. They are parallel to each other, and are constructed in the form of a plurality of flat ring-shaped disks. Each one of the ring-shaped damping elements 14, as best seen in FIGS. 2-4, preferably includes a metallic core 15 which is either completely or at its top and bottom sides coated with a coating or covering 16 of sound-absorbing or sound-muffling material. Guide vanes 18 are located in the space between adjacent damping elements 14 and between the respective damping elements 14 adjacent the back wall 6 and the front wall 7, 7′. The spacing between the respective damping elements 14 is defined by the axial length of the spacing elements 17—see FIG. 1b—or by the guide vanes 18. The guide vanes 18 may function as spacing elements 17. The entire damping element assembly or package, formed by the damping elements 14 and the respective front and back walls, as well as the cylindrical outer housing wall 8, is held together by tension screws 25, of which only one is seen in FIG. 1b. The tension screws clamp the respective spacing elements, vanes, and front and back walls together.

In accordance with the present invention, the vanes are located, uniformly circumferentially distributed, in the stream of inrush air from the outside of the housing to the inlet funnel 3 of the compressor. They extend essentially perpendicularly to the plane of the damping elements, but are inclined with respect to a radial direction 19—see FIGS. 5 to 8—by an angle A between about 0° and 5° at their inlet edge. The outlet edge includes an angle A′ between about 20° and 30° with a line 19′ perpendicular to the radial direction.

In its simplest form, the housing circumference portion 8 is made circular in cross section; it need not be circular, however, but may be differently shaped, for example be polygonal with 6 to 8 segments. The radial line 19 intersects the axis of the housing, defined, for example, by the axis of rotation of the turbine wheel 2 and/or the shaft 13 or of the shaft 12, if used.

The guide vanes 18 direct the air sucked in radially inwardly through the outer housing portion 8, including the air filters thereof, and so direct the air within the interior of the muffler or sound damping structure that within the interior space 20—see FIGS. 1a, 1b and FIG. 2—a rotating air column will result or, in other words, an air flow or air stream in which any discrete volume of air will progress towards the inlet funnel 3 and hence to the compressor wheel 2 in a spiral path.

The guide vanes 18 may be straight—see FIG. 5—or may be curved; they may be single plate-like elements of constant thickness—see FIGS. 5 and 6—or may have an air wing cross section, as shown in FIGS. 7 and 8.

The muffler can be constructed in various ways, and various modifications and changes may be made. The embodiment of FIG. 2 illustrates a metallic core 15 of each damping element 14, in which the guide vanes 18 are integral with the metallic cores 15 of the damping elements 14, for example forming a single casting therewith.

FIG. 3 illustrates a construction in which the metallic core 15c of the damping elements 14c are formed by ring-shaped, internally open sheet-metal plates on which the guide vanes 18c, in the form of sheet-metal plates, are welded. The guide vanes are uniformly distributed about the circumference. Preferably, a guide vane 18c is welded to one sheet-metal plate 15c on one side, and held, as will appear, against a similar neighboring element, by compression of the screws 25 (FIG. 1b). In another embodiment, the metallic cores 15d (FIG. 4) of the respective damping elements 14d are secured to guide vanes 18d by forming holes 22 in the metallic cores 15d and extending the guide vanes 18d by small pin-like extensions 21, fitting into the holes 22.

The guide vanes 18 of any one of the embodiments described, as well as in the embodiments of FIGS. 5 to 8, may be coated with a coating 23 (FIGS. 6 and 8) of sound damping material.

The guide vanes 18, in the various embodiments described, then can function simultaneously as the spacer elements 17; they are located within the spacing range; alternatively, separate spacer elements 17, for example in the form of sleeves surrounding the screws 25, may be used.

The guide vanes 18, as illustrated in FIG. 1a, and FIGS. 2 and 3, for example, may form simultaneously the spacer elements, by so dimensioning the guide vanes in axial direction that they slightly compress the sound dampening or sound muffling or sound deadening material 16 surrounding the disk-like damping elements 14 by compressing the outer facing surfaces 24 (FIGS. 2, 3) slightly by tightening the screws 25. This insures tight connection between adjacent damping elements 14 and tight connection and placement of the guide vanes 18, without possibility of vibration which might introduce additional noise. In the embodiment of FIG. 4, the guide vanes 18d extend between the respective sides of the metallic core 15d of the damping elements, from one to the next, so that the respective guide vanes 18d are located on both sides of the cores 15d of the damping elements 14d. The screws 25, then, insure that the respective guide vanes 18d and the damping elements 14d are tightly held together and tightly connected to the front and back walls 7, 7′, and 6, respectively, of the muffler, while, preferably also retaining the circumferential air-pervious, air-filtering wall 8.

In a preferred and simple form of the invention, the guide vanes 18 are angularly aligned within the respective regions defined by spacers 17; this, however, is not a necessary requirement due to the rotation-symmetrical supply of air to the air column which is then supplied to the inlet funnel 3 of the turbo air charger.

The angle of inclination A (identified only in FIG. 5 for simplicity of the drawings) may be the same in all spacing regions, or may change in dependence on the desired distribution of rotation of the air to the inlet 3 of the compressor 1, and, thus, may change, preferably uniformly, or in accordance with a mathematical function, as a function of the distance of the respective guide vanes 18 from the plate 6, that is, the inlet to the air funnel 3 of the turbo charger.

Additional various changes and modifications may be made, and features described in connection with any one of the embodiments may be uesd with any of the others, within the scope of the inventive concept.

The sound absorber or muffler may be used with all types of turbine air compressors, for example, and typically, for exhaust gas turbines superchargers; it may, however, be used with other types of turbine compressors, for example for furnaces, gas turbines or the like, in which the motor 11 (FIG. 1a) then is preferably used.

Suitable sound absorbing material 16, 23, for coating the damping elements 14 and the flow directing vanes 18, respectively, is: felt.

A suitable angle A of the inlet edge with respect to a radial line is between about 0° and 5°. The variation of the angle may depend on the distance of the respective element 18 from the supercharger inlet 3; for example the angle A may be larger for guide vanes 18 closer to the inlet of the funnel 3 of the turbine air charger 1. A suitable angle A' of the outlet edge with respect to a line perpendicular to the radial line is between about 20° and 30°.

I claim:

1. Sound absorber or muffler, for a turbo compressor or air charger, particularly for an internal combustion engine exhaust gas turbine supercharger, to muffle the intake air to the air charger and guide the intake air to an air inlet (3) of the air charger (1), comprising
    a tubular housing, said tubular housing having a central axis,
    a front wall (7, 7') closing off the tubular housing at one end,
    a back wall (6) adapted to be coupled to the inlet of the air charger (1) and
    a circumferential, at least partly air-pervious, housing wall (8) extending between the front and back walls (7, 7', 6;
    a plurality of radially extending disk-like noise damping elements (14), each having a radially outer edge and a radially inner edge, located within the tubular housing between the front wall (7, 7') and the back wall (6);
    spacer means (17) spacing the damping elements (14) axially, along the axis of said tubular housing, from each other;
    means (25) for retaining the spacer means and the noise damping elements in assembled position within the housing,
    guide vanes (18) located in the stream or air flow from the outside of the tubular housing towards the interior thereof and extending essentially perpendicularly to the plane of the damping elements (14) at radial distances from said housing axis intermediate radial distances of said inner and outer edges of said damping elements (14), while being inclined with respect to a radial line (19) passing through the axis of the housing, said vanes being essentially uniformly circumferentially distributed within the housing and directing air being sucked through the air-pervious periphery of the housing by the air charger (1) in a rotating direction about the axis of the housing, and thereby supplying the air to the air charger in the form of a rotating air column or rotating air stream in which any discrete air volume progresses towards the inlet (3) of the air charger (1) in a spiral path.

2. Sound absorber or muffler according to claim 1, wherein the housing, in cross section, is essentially circular.

3. Sound absorber or muffler according to claim 1, wherein the guide vanes (18b, 18c, 18d) are curved.

4. Sound absorber or muffler according to claim 1, wherein the guide vanes (18a) are flat.

5. Sound absorber or muffler according to claim 1, wherein the thickness of the guide vanes (18a, 18b) is uniform throughout their extent.

6. Sound absorber or muffler according to claim 1, wherein the guide vanes (18c, 18d), in cross section, have air-foil or teardrop shape.

7. Sound absorber or muffler according to claim 1, wherein the damping elements comprise a metallic core (15) and the guide vanes (18) are metallic and at least one damping element and one guide vane form a single casting, the guide vanes forming said spacer means.

8. Sound absorber or muffler according to claim 1, wherein the guide vanes (14) include a metallic core (15) formed of a ring-shaped sheet-metal plate;
    and the guide vanes (18) comprise sheet-metal vanes welded or brazed to the sheet-metal damping elements.

9. Sound absorber or muffler according to claim 1, wherein the damping elements comprise a core structure (15) in plate-like form, formed with transverse through-holes (22);
    and the guide vanes (18d) include projecting pins (22) fitting into the through-holes (21) to connect adjacent or neighboring damping elements together and to form said spacer means.

10. Sound absorber or muffler according to claim 1, including sound damping or sound muffling material (23) coating or jacketing the guide elements (18).

11. Sound absorber or muffler according to claim 1, wherein the guide elements (18) are respectively angularly aligned.

12. Sound absorber or muffler according to claim 1, wherein the angle of inclination (A) of the guide elements (18) with respect to the radial line (19) passing through the axis of the housing of all the guide elements is uniform.

13. Sound absorber or muffler according to claim 1, wherein the angle of inclination (A) of the guide elements (18) with respect to the radial line (19) passing through the axis of the housing varies in dependence on the spacing of the respective guide element from the inlet (3) of the air charger.

14. Sound absorber or muffler according to claim 1, wherein the guide vanes (18) simultaneously form said spacer means (17).

* * * * *